United States Patent
Papandreou

Patent Number: 5,897,132
Date of Patent: Apr. 27, 1999

[54] STEERING WHEEL AND AIR BAG ASSEMBLY ATTACHMENT TO A STEERING SHAFT

[75] Inventor: John P. Papandreou, Medford, N.Y.

[73] Assignee: TRW Inc., Lyndhurst, Ohio

[21] Appl. No.: 08/909,186

[22] Filed: Aug. 11, 1997

Related U.S. Application Data

[60] Provisional application No. 60/029,498, Oct. 29, 1996.

[51] Int. Cl.$^6$ ..................................................... B60R 21/16
[52] U.S. Cl. ........................................ 280/728.2; 280/731
[58] Field of Search .............................. 280/728.2, 731, 280/779; 74/552, 553

[56] References Cited

U.S. PATENT DOCUMENTS

| | | |
|---|---|---|
| 5,144,861 | 9/1992 | Nishijima et al. . |
| 5,431,438 | 7/1995 | Manabe . |
| 5,470,099 | 11/1995 | Williams . |
| 5,553,888 | 9/1996 | Turner et al. . |
| 5,570,901 | 11/1996 | Fyrainer . |
| 5,584,501 | 12/1996 | Walters . |
| 5,584,503 | 12/1996 | Lutz . |
| 5,615,910 | 4/1997 | Margetak et al. . |
| 5,676,396 | 10/1997 | Fohl ........................................ 280/731 |
| 5,692,769 | 12/1997 | Scharhoneau et al. .............. 280/728.2 |
| 5,692,770 | 12/1997 | Scharboneau et al. . |
| 5,749,598 | 5/1998 | Exner et al. .......................... 280/728.2 |

FOREIGN PATENT DOCUMENTS 0728652  8/1996  European Pat. Off. .

OTHER PUBLICATIONS

GMI Engineering and Management Institute Senior Thesis Project, "Design of a One–Piece Steering Wheel/Airbag Cover," by Mark Scharboneau dated May 28, 1993.

*Primary Examiner*—Christopher P. Ellis
*Attorney, Agent, or Firm*—Tarolli, Sundheim, Covell, Tummino & Szabo

[57] ABSTRACT

An assembly is provided for mounting on a vehicle steering shaft which rotates about an axis to steer the vehicle and which has a threaded end portion. The assembly includes a steering wheel armature (10), a hub (34) fixedly connected to the steering wheel armature (10) and for non-rotatable attachment to the steering shaft, an inflatable vehicle occupant restraint (50), an inflator (15) for providing inflation fluid for inflating the vehicle occupant restraint (50), a frame (24) supporting the vehicle occupant restraint (50) and the inflator (15) on the steering wheel armature (10), and a cover (35) covering the steering wheel armature (10), the vehicle occupant restraint (50), and the inflator (15). A rotatable fastener (30) axially forces the assembly onto the steering shaft with the hub (34) non-rotatably attached to the steering shaft. The fastener (30) has a portion (33) for threaded engagement with the threaded end portion of the steering shaft. The assembly has a surface (34a) supporting the fastener (30) on the assembly for rotation relative to the assembly. The fastener (30) includes a driven portion (32) for rotating the fastener in one direction relative to the assembly about the axis of the steering shaft to effect the axial forcing.

9 Claims, 5 Drawing Sheets

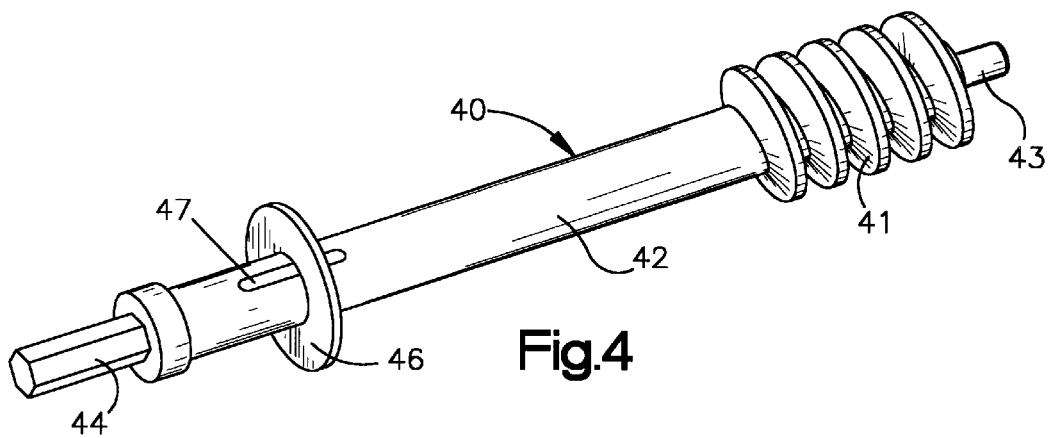
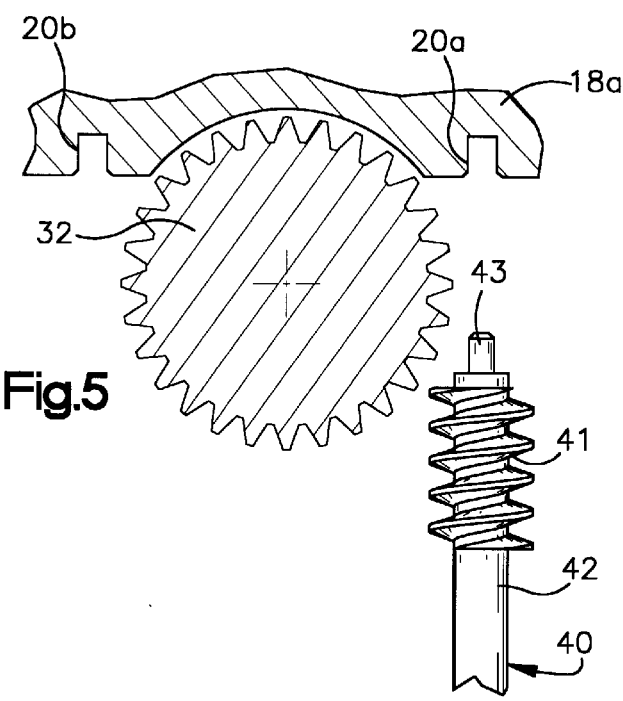
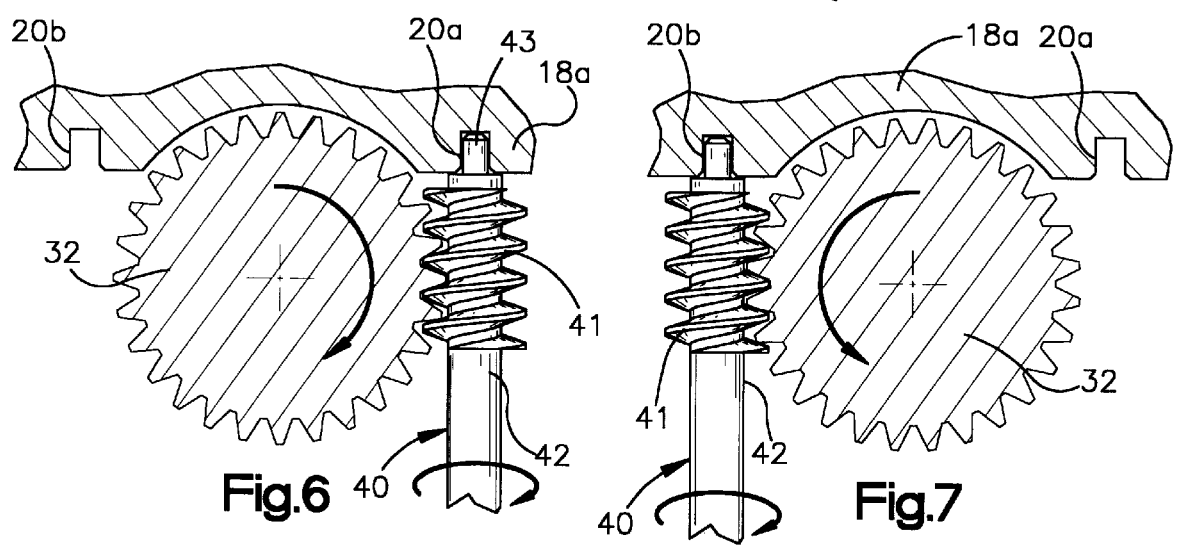

STEERING WHEEL AND AIR BAG ASSEMBLY ATTACHMENT TO A STEERING SHAFT

RELATED APPLICATION

This application claims priority from United States provisional patent application Ser. No. 60/029,498, filed Oct. 29, 1996, entitled "Means for Attaching a Pre-assembled or Integral Steering Wheel Assembly onto the Steering Column Shaft Using Conventional Coupling Means".

FIELD OF THE INVENTION

The present invention relates to the attachment of a steering wheel and air bag assembly to a steering shaft of a vehicle. More particularly, the present invention relates to the attachment of a steering wheel and air bag assembly to a steering shaft of a vehicle that permits the entire assembly to be assembled prior to attachment to the steering shaft.

BACKGROUND OF THE INVENTION

A typical assembly process for a vehicle steering wheel having a driver's side air bag involves a series of sequential steps. For example, a steering wheel is first attached to a steering shaft using a fastener which is accessed and tightened in a center area of the steering wheel. Next, an air bag module is placed in the center area of the steering wheel and secured thereto.

This process, however, does not work with a steering wheel and air bag assembly having a one-piece integral cover on the steering wheel and covering the air bag.

SUMMARY OF THE INVENTION

The present invention is an apparatus comprising an assembly to be mounted on a vehicle steering shaft which rotates about an axis to steer the vehicle and which has a threaded end portion. The assembly comprises a steering wheel armature, a hub fixedly connected to the steering wheel armature and for non-rotatable attachment to the steering shaft, an inflatable vehicle occupant restraint, an inflator for providing inflation fluid for inflating the vehicle occupant restraint, support means supporting the vehicle occupant restraint and the inflator on the steering wheel armature, and cover means covering the steering wheel armature, the vehicle occupant restraint, and the inflator. A rotatable fastener axially forces the assembly onto the steering shaft with the hub non-rotatably attached to the steering shaft. The fastener has a portion for threaded engagement with the threaded end portion of the steering shaft.

The assembly has means supporting the fastener on the assembly for rotation relative to the assembly. The fastener includes a driven portion comprising a worm wheel gear for rotating the fastener in one direction relative to the assembly about the axis of the steering shaft to effect the axial forcing.

The assembly includes means providing an access opening for receiving a driving tool for driving the driven portion of the fastener thereby rotating the threaded portion of the fastener.

BRIEF DESCRIPTION OF THE DRAWINGS

Further features of the present invention will become more apparent from the ensuing description when considered together with the accompanying drawings wherein:

FIG. 4 is a perspective view of a removable worm gear tool for use with the steering wheel and air bag assembly of the present invention;

FIG. 5 is a schematic plan view illustrating the relative positions of the removable worm gear tool of FIG. 4 and a fastener for attaching the steering wheel and air bag assembly to a vehicle steering wheel prior to their engagement;

FIG. 6 is a schematic plan view similar to FIG. 5 illustrating the removable worm gear tool engaged with the fastener to accomplish attachment of the steering wheel and air bag assembly to the vehicle steering shaft;

FIG. 7 is a schematic plan view similar to FIG. 6 illustrating the relative positions of the removable worm gear tool and the fastener to accomplish disengagement of the steering wheel and air bag assembly from the steering shaft.

DESCRIPTION OF A PREFERRED EMBODIMENT

Figure 1:
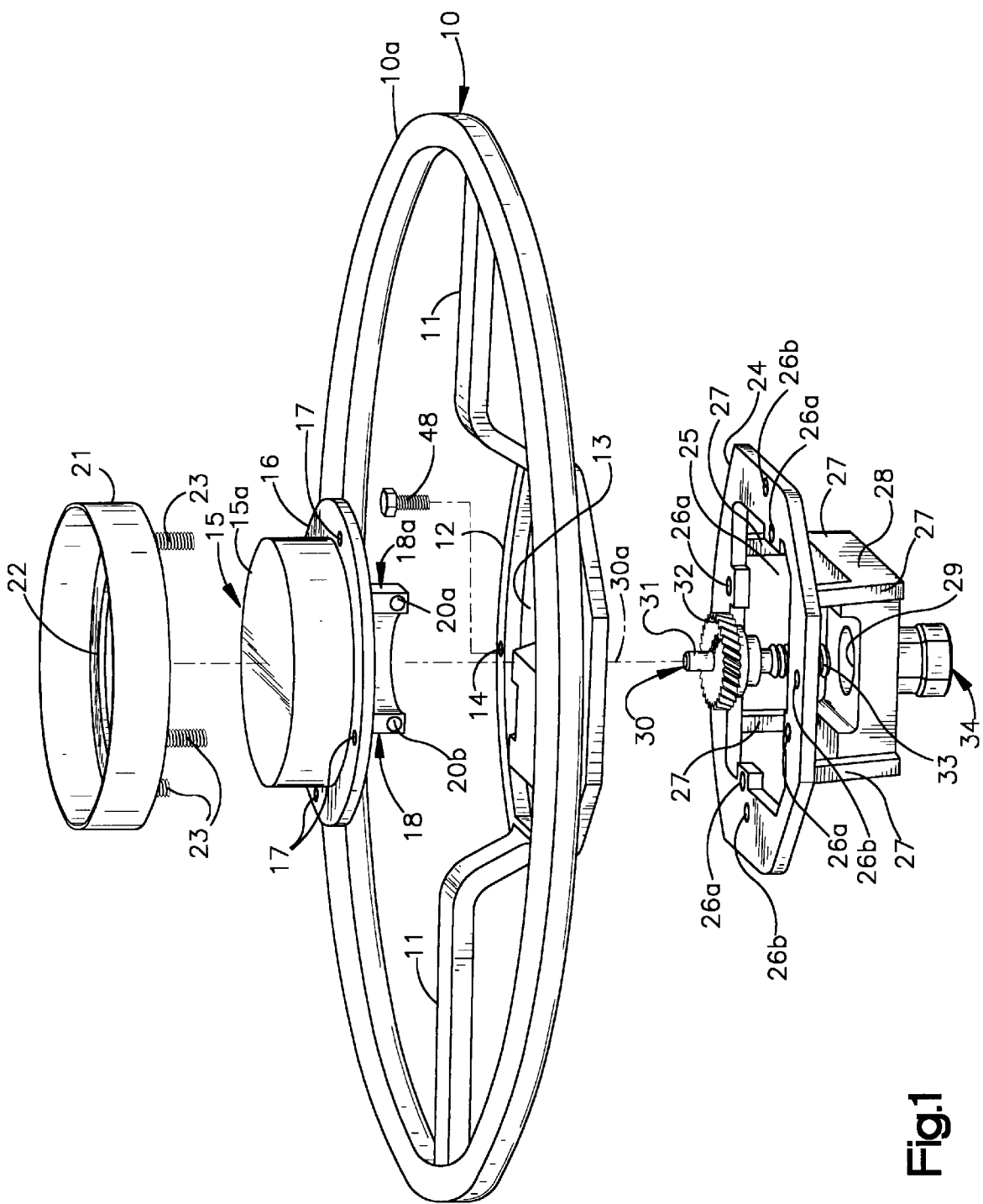
FIG. 1 is an exploded perspective view of a steering wheel and air bag assembly according to the present invention.

With reference to the various figures wherein like reference numerals identify like parts, FIG. 1 illustrates a steering wheel and air bag assembly according to the present invention which includes a die cast steering wheel armature 10 having a rim 10a, a plurality of inwardly disposed radial arms (or spokes) 11, and an upper frame 12. The upper frame 12 is fixedly connected to the rim 10a by the spokes 11. The upper frame 12 has a central opening 13 defined therein and is provided with a plurality of spaced apertures 14 about its periphery for receiving a plurality of fasteners 48.

Figure 2:
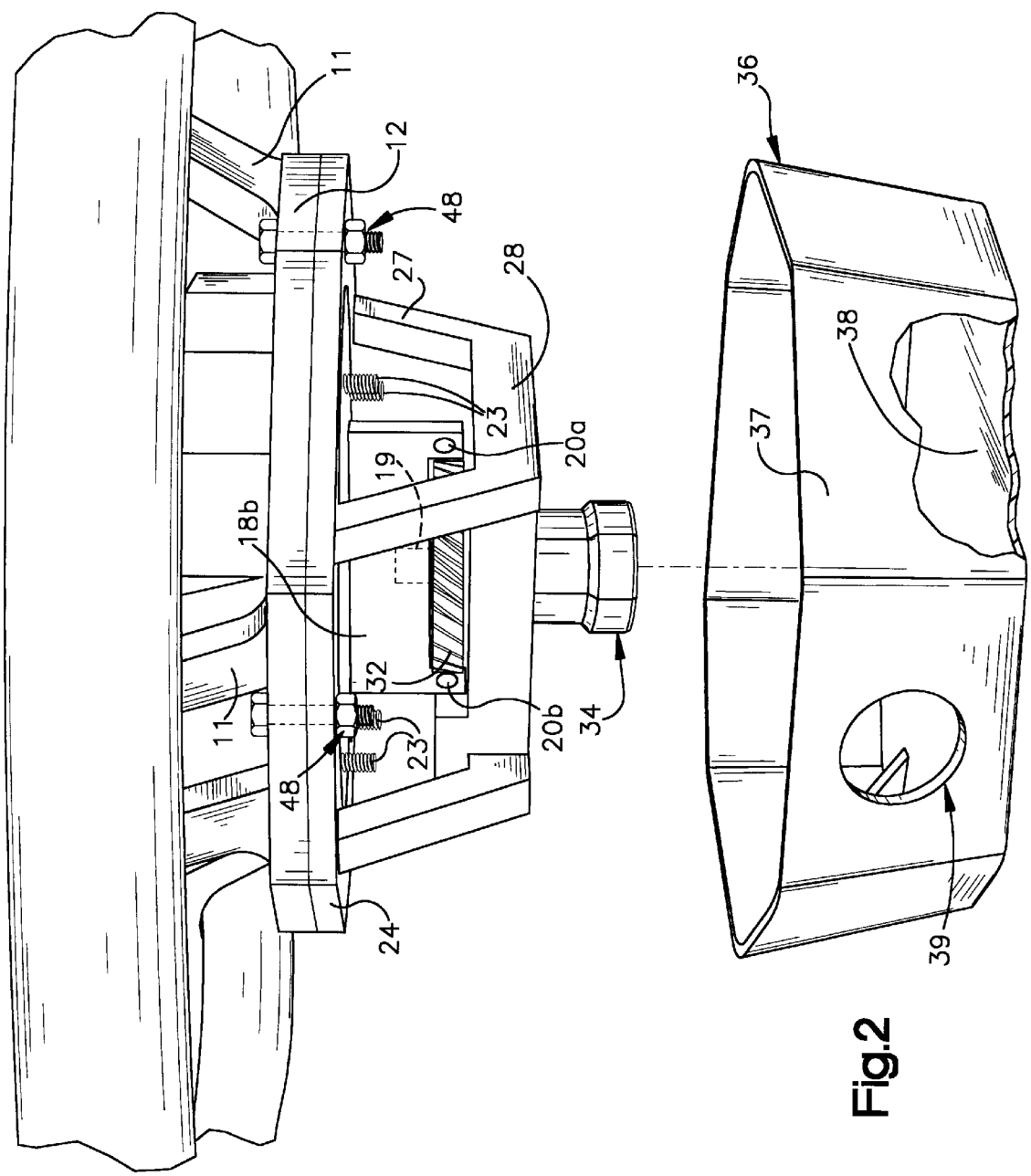
FIG. 2 is an exploded perspective view of a portion of FIG. 1 illustrating further parts of the present invention.
Figure 3:
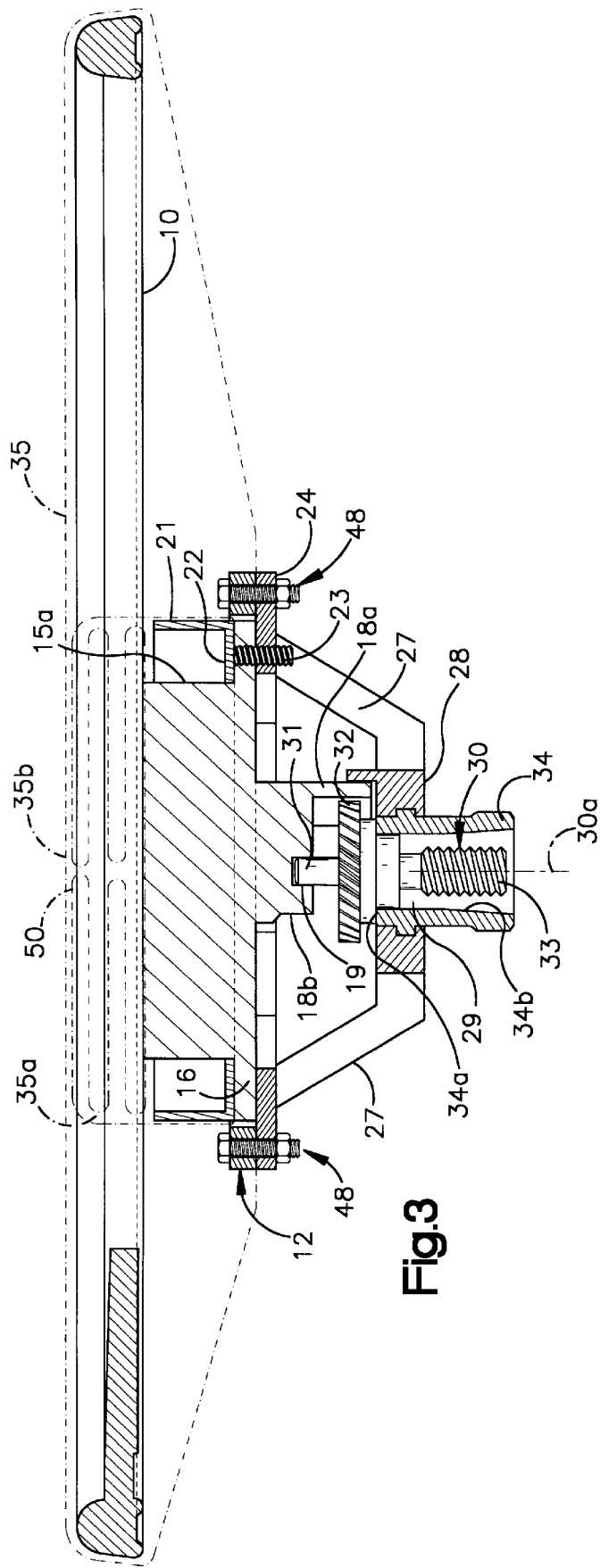
FIG. 3 is a sectional view of the steering wheel and air bag assembly of FIG. 1.

An air bag inflator 15 (FIG. 1) provides inflation fluid to inflate an inflatable vehicle occupant restraint or air bag 50 (shown schematically in FIG. 5). The inflator 15 has a cylindrical housing 15a. The bottom of the inflator housing 15a has an outwardly extending flange 16 with a plurality of circumferentially spaced apertures 17 formed therein. A centrally positioned guide portion 18 extends downward from the inflator housing 15a. The guide portion 18 can be formed integrally with the housing 15a or as a separate part. When viewed in cross-section, the guide portion 18 includes a generally C-shaped lower portion 18a and a generally D-shaped upper portion 18b. The upper portion 18b has a centrally located axially extending bore 19 (FIGS. 2 and 3). The lower portion 18a of the shaft guide 18 has a pair of spaced apart transverse bores 20a and 20b (FIGS. 1 and 5) formed therein. The transverse bores 20a, 20b do not intersect the axial bore 19.

An air bag retainer 21 secures the air bag 50 to the inflator housing 15a. The retainer 21 has an inwardly extending, circumferential flange 22 at its lower end and a plurality of downwardly extending, circumferentially spaced studs 23 which are positioned to be received through openings (not shown) in the air bag 50 and then also through the apertures 17 in the flange 16 of the inflator housing 15a. The air bag 50 is thus retained by being clamped between the inflator flange 16 and the retainer flange 22, with the retainer 21 being disposed inside the air bag.

An integral cover 35, shown schematically in FIG. 3, is molded about the steering wheel armature 10. In particular, the cover 35 covers the rim 10a, spokes 11 and the perimeter of the upper frame 12. The cover 35 defines a chamber 35a in which the air bag 50 and the inflator 15 are located. The cover 35 has an upper continuous surface 35b which extends uninterruptedly over the air bag 50, the inflator 15, and the steering wheel armature 10. Thus, the cover 35 covers the inflator 15 and the air bag 50 as well as the armature 10. In accordance with the preferred embodiment of the invention, the cover 35 is made of a urethane material. It is contemplated that the cover 35 could be made from several cover portions rather than the integral cover shown. For example, an alternate cover consideration could include a first cover portion covering the steering wheel rim 10a and a second detachable cover portion covering the air bag 50.

The steering wheel and air bag assembly includes a lower frame 24 having a central opening 25 defined therein and a plurality of spaced apertures 26a formed about its periphery for receiving the studs 23 therethrough. The lower frame 24 also has a plurality of spaced apertures 26b for receiving the fasteners 48 to connect the lower frame to the upper frame 12. The lower frame 24 further includes a plurality of depending legs 27 which support a generally rectangular sub-frame 28.

A tubular-shaped hub 34 is fixedly connected to the lower frame 24 and includes a central passage 29 to receive a portion of a rotatable fastener 30 described below. The hub 34 includes an upper surface 34a which extends radially from the central passage 29. An inner surface 34b of the hub 34 is partially tapered, as may be seen in FIG. 3, for receiving a tapered outer surface on one end of a vehicle steering shaft (not shown).

The rotatable fastener 30 (FIG. 3) comprises a first end portion 31, a worm wheel gear portion 32, and a second end portion 33. The worm wheel gear portion 32 is intermediate the first and second end portions 31, 33. The first end portion 31, the worm wheel gear portion 32, and the threaded second end portion 33 of the fastener 30 are fixed together and rotate together. Preferably, the fastener 30 is made from one piece of a metallic material.

The second end portion 33 of the fastener 30 is externally threaded and screws into an internally threaded opening in the tapered end of the steering shaft. The fastener 30 is rotatable about its axis 30a which is coaxial with the axis of rotation of the vehicle steering shaft.

The fastener 30 rests on and is supported for rotation by the upper surface 34a of the hub 34. The first end portion 31 of the fastener 30 is located and rotatable in the axial bore 19 in the guide portion 18. The second end portion 33 of the fastener 30 extends into the passage 29 in the hub 34, and terminates approximately in the plane in which the hub 34 terminates.

A lower cover 36 which covers the lower frame 24 is illustrated in FIG. 2. The lower cover 36 can be constructed to have a single, circular side wall or a plurality of contiguous, angularly joined panels forming the side wall 37 and a bottom wall 38. An opening 39 in the side wall 37 serves as an access means to facilitate entry within the lower cover 36 to position and engage or disengage and remove a driving tool 40 to be described later without the need to remove the lower cover 36. An aperture (not shown) is provided in the center of the bottom wall 38 to accommodate the extension of the hub 34 therethrough.

The assembly of the aforementioned parts includes locating the fastener 30 on the upper surface 34a of the hub 34. Then, studs 23 are positioned through the apertures (not shown) in the air bag 50, through the apertures 17 in the inflator flange 16, and through the apertures 26a in the lower frame 24 while guiding the first end portion 31 of the fastener 30 into the axial bore 19 in the guide portion 18. Nuts (not shown) are threaded onto the ends of the studs 23 to secure the retainer 21, the air bag 50 and the inflator 15 to the lower frame 24.

The upper frame 12 of the steering wheel armature 10 is then attached to the lower frame 24 by the fasteners 48 which extend through the apertures 14 in the upper frame 12 and the apertures 26b in the lower frame 24. Next, the bottom cover 36 is secured by fasteners (not shown) to the lower frame 24 so that the hub 34 extends beyond the planar surface of the bottom wall 38 of the bottom cover 36 and the access port 39 in the side wall 37 of the bottom cover 36 is approximately aligned with the worm wheel gear portion 32 of the fastener 30. The steering wheel and air bag assembly is then complete and is thus ready to be secured to the steering shaft.

The steering wheel and air bag assembly is secured to the steering shaft by first locating the hub 34 coaxial with the steering shaft. When so located, the threaded second end portion 33 of the fastener 30 is aligned with the internally threaded opening in the end of the steering shaft.

A driving tool 40 for rotating the fastener is now inserted through the access opening 39 in the lower cover 36. The driving tool 40 (FIG. 4) comprises a worm gear portion 41 disposed on one end of a hollow shaft portion 42 and a drive portion 44 fixed to the other end of the shaft portion 42. The drive portion 44 is adapted to be rotated by a wrench or other conventional tool. The driving tool 40 further comprises a retractable pin portion 43 disposed coaxially within the shaft portion 42. The pin portion 43 is spring-biased (by a spring not shown) such that the terminal end of the pin portion extends beyond the terminal end of the worm gear portion 41 on the shaft portion 42. The pin portion 43 may be retracted into the shaft portion 42, against the spring bias, by manually pulling on a ring 46 which is connected to the pin portion 43 through a longitudinal slot 47 in the shaft portion.

During assembly, the pin portion 43 of the driving tool 40 is inserted into and received by the transverse bore 20a in the guide portion 18 to locate the tool 40. The gear portion 41 of the driving tool is located in meshing engagement with the gear portion 32 of the fastener 30. Rotation of the gear portion 41 of the driving tool 40 causes the fastener 30 to rotate in a tightening direction (clockwise as viewed in FIG. 6) and to become screwed into the internally threaded opening in the end of the vehicle steering shaft. The rotation of the fastener 30 in the tightening direction moves the fastener axially toward the steering shaft, thereby forcing the steering wheel and air bag assembly downward relative to the steering shaft as viewed in FIG. 3. As the steering wheel assembly is forced downward relative to the steering shaft, the tapered surfaces on the hub 34 and on the steering shaft are pressed together to secure the steering wheel and air bag assembly to the steering shaft. In addition, complimentary flats (not shown) on the hub 34 and on the steering shaft provide an alignment of the steering on the steering shaft provide an alignment of the steering wheel air bag assembly on the steering shaft as well as a means for transmitting torque from the steering wheel to the steering shaft.

When the fastener 30 has been completely tightened, the driving tool 40 may be removed from the steering wheel and air bag assembly by first pulling axially on the ring 46 in a direction away from the gear portion 42 which retracts the pin portion 43 from the transverse bore 20a and moves the pin portion coaxially into the interior of the shaft portion 42 of the tool 40. The tool 40 is then moved slightly radially away from the worm wheel gear portion 32 of the fastener 30 so that the respective gear portions of the tool and the fastener disengage. The tool 40 can now be removed from the assembly through the opening 39 in the cover 36.

With the steering wheel and air bag assembly installed on the steering shaft, torque which is produced by turning the steering wheel (i.e., steering the vehicle) is transmitted through the spokes 11 to the interconnected upper and lower frames 12 and 24, to the hub 34 which is fixed to the lower frame 24, and from the hub 34 to the steering shaft.

The description above relates to attaching the steering wheel and air bag assembly to the steering shaft of a vehicle by rotation of the fastener 30 in a tightening direction. After the steering wheel and air bag assembly is secured to the steering shaft by the fastener 30, the assembly can be removed from the steering shaft by inserting the pin portion 43 of the tool 40 into the transverse bore 20b in the guide portion 18 until the respective gear portions 32 and 41 become engaged and then rotating the fastener 30 in the same direction as shown in FIG. 7. This rotation causes the fastener 30 to rotate counter-clockwise (as viewed in FIG. 7) and to move axially and relatively away from the steering shaft. The top end of the first end portion 31 of the fastener 30 will abut against a facing surface of the axial bore 19 in the guide portion 18. This will apply an upward force on the steering wheel and air bag assembly and, particularly the hub 34, causing disengagement of the hub 34 and steering shaft and permitting removal of the steering wheel and air bag assembly from the steering shaft. The tool 40 is removed from the assembly by first retracting the pin portion 43 as described above.

Figure 8:
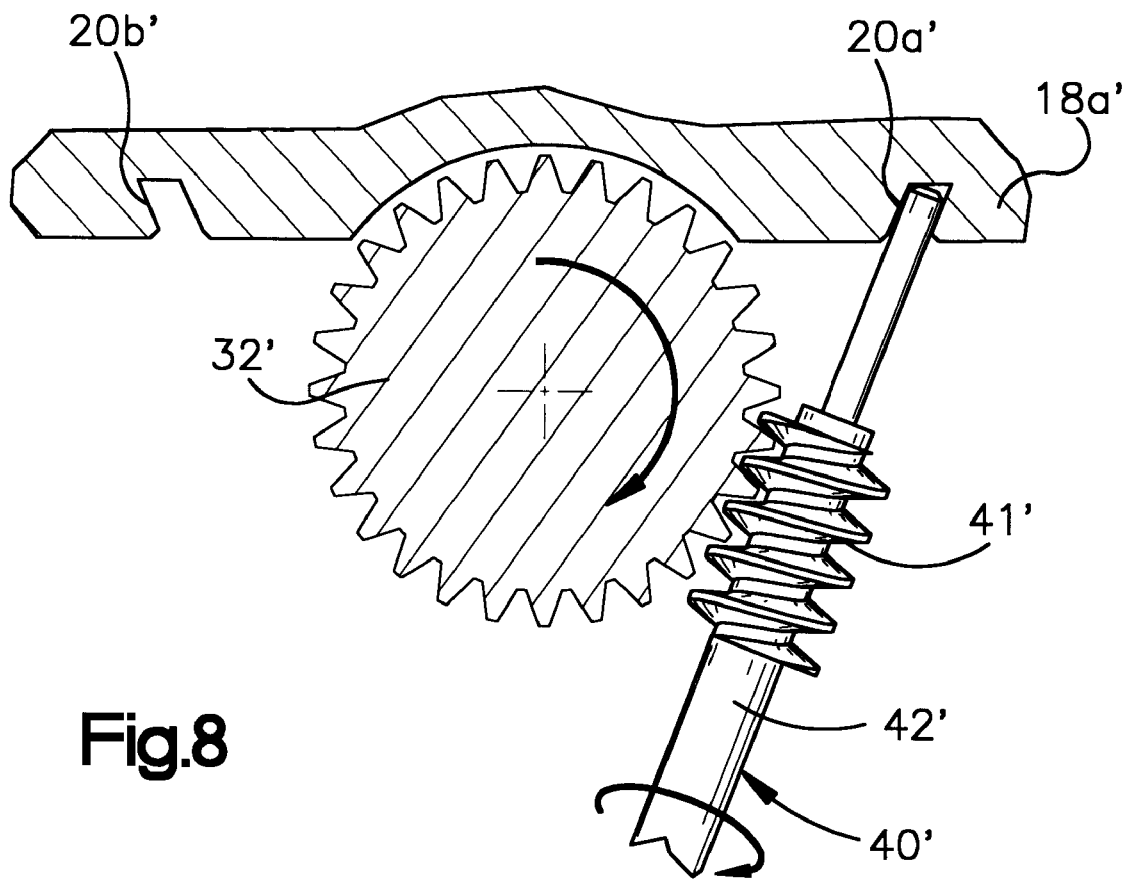
FIG. 8 is a schematic plan view similar to FIG. 6 illustrating an alternate embodiment of the present invention.

FIG. 8 illustrates an alternate embodiment of the present invention. Parts shown in FIG. 8 which are similar to parts described in the previous embodiment are designated with a prime. In the embodiment of FIG. 8, the transverse bores 20a' and 20b' disposed on opposite sides of the worm wheel gear portion 32' are not oriented normal to the surface of the guide portion 18' as in the previous embodiment. Instead, the bores 20a' and 20b' each are angled inwardly toward the worm wheel gear portion 32'. This alternate construction permits the size of the access opening 39 in the cover 36 to be smaller than that of the previous embodiment.

Although the invention has been described with particularity and in some detail, it will be appreciated by those skilled in the art that changes and modifications can be made therein without departing from the scope and spirit of the claimed invention.

Having described the invention, I claim:

1. An apparatus comprising:
   an assembly to be mounted on a vehicle steering shaft which rotates about an axis to steer the vehicle and which has a threaded end portion, said assembly comprising:
   a steering wheel armature;
   a hub fixedly connected to said steering wheel armature and for non-rotatable attachment to the steering shaft;
   an inflatable vehicle occupant restraint;
   an inflator for providing inflation fluid for inflating said vehicle occupant restraint;
   support means supporting said vehicle occupant restraint and said inflator on said steering wheel armature; and
   cover means covering said steering wheel armature, said vehicle occupant restraint, and said inflator; and
   a rotatable fastener for axially forcing said assembly onto the steering shaft with said hub non-rotatably attached to the steering shaft said fastener having a portion for threaded engagement with the threaded end portion of the steering shaft;
   said assembly having means supporting said fastener on said assembly for rotation relative to said assembly;
   said fastener including a driven portion for rotating said fastener in one direction relative to said assembly about the axis of the steering shaft to effect said axial forcing, said driven portion comprising a worm wheel gear;
   said inflator having a housing and a guide portion extending downwardly from said housing, said guide portion having an axial bore for receiving a portion of said rotatable fastener and a pair of spaced apart transverse bores for receiving a portion of a driving tool.

2. An apparatus as set forth in claim 1 wherein said driven portion of said fastener is located axially between said guide portion and said hub.

3. An apparatus as set forth in claim 1 wherein each of said pair of transverse bores in said guide portion is positioned for receiving an end portion of the driving tool to locate an adjacent worm gear portion of the driving tool for meshing engagement with said fastener.

4. An apparatus as set forth in claim 3 wherein the end portion of the driving tool is retractable for removing the driving tool from said assembly upon completion of said axial forcing.

5. An apparatus as set forth in claim 1 wherein said cover means covering said steering wheel armature, said vehicle occupant restraint and said inflator comprises an integral cover.

6. An apparatus as set forth in claim 5 wherein said cover means comprises a urethane material having a continuous outer surface extending uninterrupted over said steering wheel armature, said vehicle occupant restraint and said inflator.

7. An apparatus comprising:
   an assembly to be mounted on a vehicle steering shaft which rotate s about an axis to steer the veh icle and which has a threaded end portion, said assembly comprising:
   a steering wheel armature;
   a hub fixedly connected to said steering wheel armature and for non-rotatable attachment to the steering shaft;
   anflatable vehicle occupant restraint;
   anflator for providing inflation fluid for inflating said vehicle occupant restraint;
   support means supporting said vehicle occupant restraint and said inflator on said stee ring wheel armature; and
   cover means covering said steering wheel armature, said vehicle occupant restraint, and said inflator; and
   a rotatable fastener for axially forcing said assembly onto the steering shaft with said hub non-rotatably attached to the steering shaft said fastener having a portion for threaded engagement with the threaded end portion of the steering shaft;
   said assembly having means supporting said fastener on said assembly for rotation relative to said assembly;
   said fastener including a driven portion for rotating said fastener in one direction relative to said assembly about the axis of the steering shaft to effect said axial forcing, said driven portion comprising a worm wheel gear;
   said assembly including means for providing an access opening for receiving a driving tool for driving said driven portion of said fastener and thereby rotating said threaded portion of said fastener, said steering wheel armature comprising a rim, an upper frame and a plurality of spokes connecting said rim to said upper frame, said support means supporting said vehicle occupant restraint and said inflator comprising said upper frame of said steering wheel armature; said assembly further includes a lower frame which connects said hub to said upper frame and a lower cover for covering said lower frame, said means for providing an access opening being located in a side wall of said lower cover.

8. An apparatus as set forth in claim 7 wherein said cover means covering said steering wheel armature, said vehicle occupant restraint and said inflator comprises an integral cover.

9. An apparatus as set forth in claim 8 wherein said cover means comprises a urethane material having a continuous outer surface extending uninterrupted over said steering wheel armature, said vehicle occupant restraint, and said inflator.

* * * * *